Nov. 11, 1958 R. Y. CASE 2,859,599
RESILIENT SHAFT COUPLING
Filed May 17, 1955 2 Sheets-Sheet 1
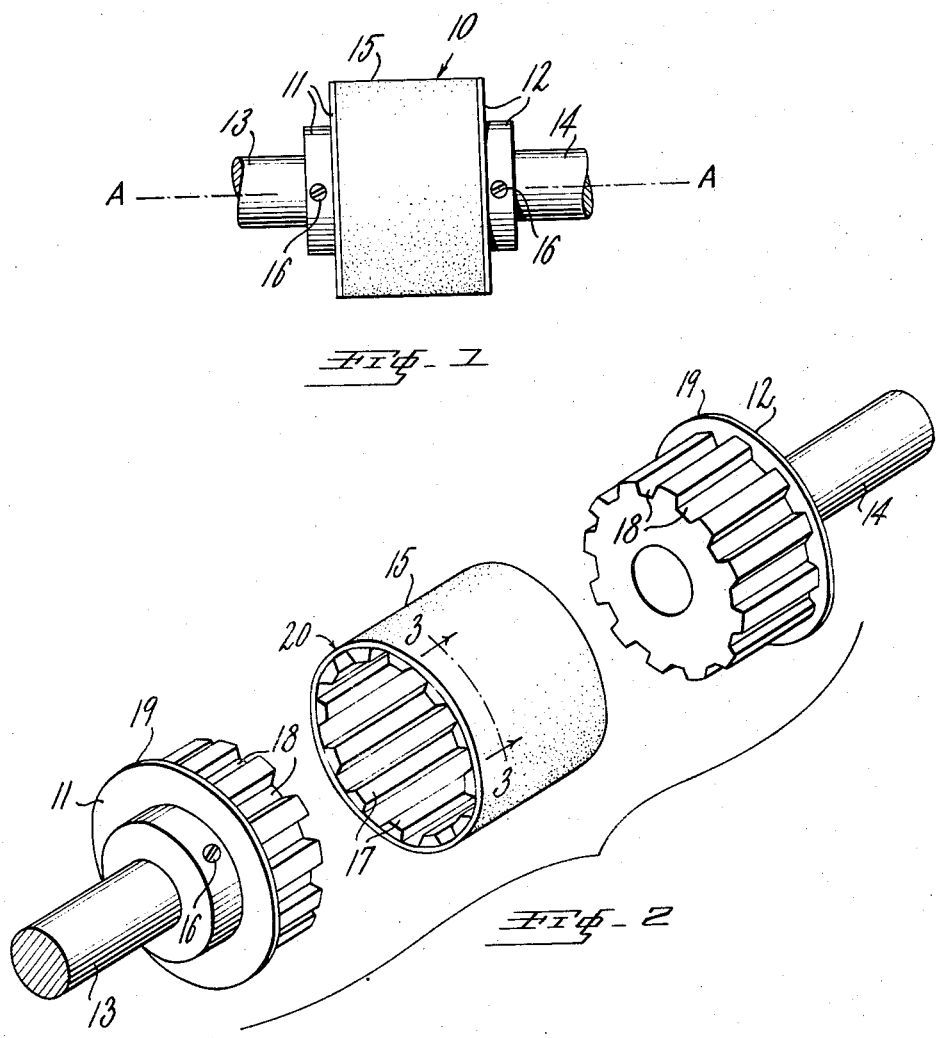
INVENTOR.
RICHARD Y. CASE
BY *William R. Epes*
ATTORNEY Nov. 11, 1958  R. Y. CASE  2,859,599
RESILIENT SHAFT COUPLING
Filed May 17, 1955  2 Sheets-Sheet 2
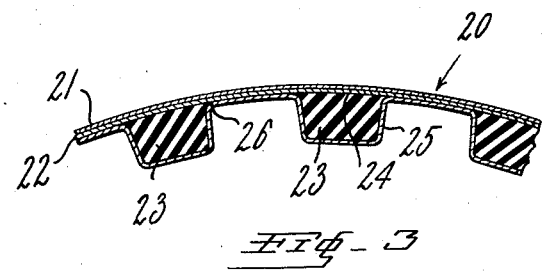
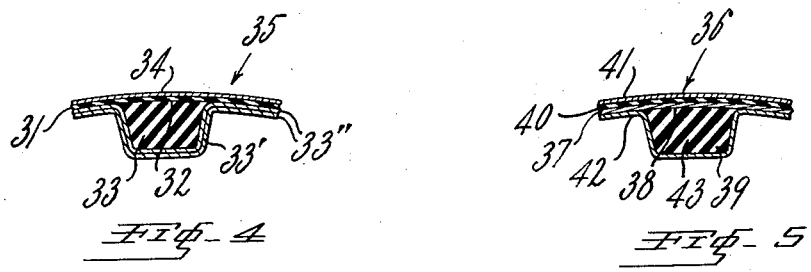
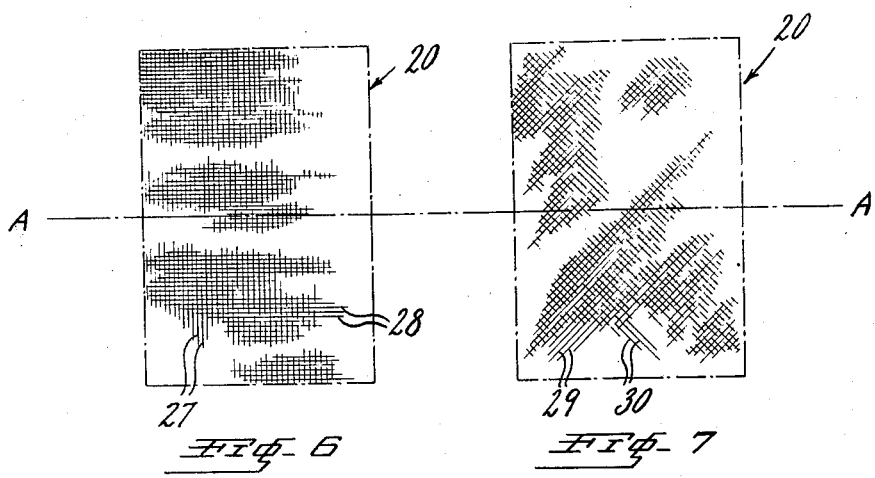
INVENTOR.
RICHARD Y. CASE
ATTORNEY United States Patent Office 2,859,599
Patented Nov. 11, 1958

2,859,599

RESILIENT SHAFT COUPLING

Richard Y. Case, Philadelphia, Pa., assignor to United States Rubber Company, New York, N. Y., a corporation of New Jersey Application May 17, 1955, Serial No. 508,903

4 Claims. (Cl. 64—11)

This invention relates to an improved flexible silent shaft coupling comprising a flexible torque load carrying band, having reinforced fabric covered resilient ribs bonded thereto, which are adapted to slidably mesh with grooves in oppositely disposed hubs on oppositely disposed shafts.

The shaft coupling embodying this invention is useful for correcting for misalignment of the two shafts to be coupled together and for providing a silently operating driving connection between the shafts by virtue of its flexible load carrying band and the resiliency of its power transmitting ribs.

Heretofore, shaft coupling having external sleeves provided with internal ribs adapted to mesh with external grooves in hubs of shafts to be coupled have been made of rigid materials, and of such rigid materials combined with resilient cushioning materials. The couplings of this prior type depended upon the relative sliding movement of the ribs on the sides of the grooves to provide for the necessary play between the coupling sleeve and the hubs to permit the unrestrained wobble between the misaligned shafts.

Furthermore such resilient ribs were not reinforced and protected by a wear resistant cover, and the movement between such ribs and the walls of the grooves in the hubs produced wear and undesirable back lash in the coupling.

In accordance with the present invention the load carrying band of the coupling sleeve is made relatively thin and it is adapted to flex axially with the bending of the resilient ribs thereon to provide for the axial wobble movement of one coupling hub in respect to the other resulting from the misalignment of the shafts. Furthermore, the ribs are reinforced with a protective reinforcing cover which increases the strength of the ribs and also prevents them from wearing on the walls of the grooves in the hubs with which they mesh.

This invention, its objects and advantages are further described in reference to the accompanying drawings, in which:

Fig. 1 is an assembled view of the shaft coupling embodying this invention;

Fig. 2 is an enlarged exploded isometric view of the shaft coupling showing each of the parts in alignment for assembly;

Fig. 3 is a fragmentary section of the coupling sleeve taken on line 3—3 of Fig. 2;

Figs. 4 and 5 are fragmentary cross-sections of the coupling sleeve showing different modifications corresponding to a portion of the section shown in Fig. 3; and Figs. 6 and 7 are plan views of layers of fabric utilized in the load carrying band of the coupling sleeve, and showing the arrangement of the yarns of the fabric in respect to the axis A—A of the sleeve.

The assembled shaft coupling embodying this invention is shown in Fig. 1, and the unassembled parts thereof are shown in Fig. 2. The coupling 10 comprises oppositely disposed hubs 11 and 12, which are affixed to oppositely disposed shafts 13 and 14. The hubs 11 and 12 are adapted to be coupled together by a sleeve 15. The hubs 11 and 12 may be affixed to the shafts 13 and 14, respectively by set screws 16.

The sleeve 15 is provided with evenly spaced axially extending ribs 17 on its inner periphery which are adapted to mesh with correspondingly spaced axially extending grooves 18 in the outer periphery of the hubs 11 and 12, which are provided with end flanges 19 for retaining the sleeve in position. The hubs are preferably made of relatively rigid material, and the sleeve 15 is made of relatively flexible and resilient materials, and is adapted to snugly fit over the hubs and yield without slipping to permit unrestricted wobble of the hubs 11 and 12 within a limited range sufficient to take care of any small misalignment of the oppositely disposed shafts 13 and 14.

The construction of the shaft coupling sleeve 15 is shown in Fig. 2, and on a larger scale in cross-section in Fig. 3. The sleeve 15 is provided with a thin flexible load carrying band 20 to which the ribs 17 are secured. The load carrying band 20 may be made of one or more layers of fabric. The thickness of each layer and the number of layers are proportioned so as to produce a load carrying band which is sufficiently thin to flex without being strained or caused to over heat in operation. As shown in Fig. 3, the band 20 is composed of two fabric layers 21 and 22, which are made of a single strip of textile fabric wound into two convolutions and bonded together with a flexible adhesive. The cores 23 of the ridges 17 are made of rubber, preferably neoprene, and the base 24 of each core is bonded to the load carrying band 20. The cores 23 are provided with a protective reinforcing and wear resistant cover 25, which is bonded to the projecting surfaces of the cores and to the load carrying band 20 between the adjacent cores.

The sleeve 15 may be made by building the parts up on a cylindrical mold having grooves cut therein corresponding to the grooves 18 of the hubs 11 and 12, and having a length at least equal to the combined length of the grooves in the two hubs. The protective cover 25 is preferably made of a woven nylon fabric impregnated with unvulcanized neoprene rubber. The fabric is wound around the periphery of the mold, and made to conform to the surfaces of the grooves and ridges on its outer periphery. The end edges of the cover 25 are preferably butted together at the top of the groove as shown at 26 in Fig. 3. Extruded strips of rubber are then laid on the fabric in the grooves of the mold so as to completely fill the grooves and form the cores 23. The then exposed surfaces of the bases 24 of the cores 23 and cover 25 are coated with a neoprene cement, and the load carrying band 20 is then applied to the periphery of the mold. The band 20 is preferably made of nylon fabric friction coated with neoprene rubber. Then the built up sleeve is wrapped with a fabric wrapping to apply pressure thereto and vulcanized in the usual manner. After the coupling has been vulcanized, the pressure applying wrapping is removed and the finished sleeve 15 is removed from the mold.

As shown in Fig. 6 the woven fabric load carrying band 20 is incorporated into the sleeve 15 so that one set of yarns 27 extends circumferentially of the sleeve, and the other set of yarns 28 extends axially thereof, or substantially parallel to the axis A—A of the sleeve 15. However the yarns may be arranged at an angle to the axis A—A of the sleeve 15 as shown in Fig. 7, in which case each set of yarns 29 and 30 of the band 20 make equal angles with the axis A—A of the sleeve.

Modifications of the load carrying band 20 are shown in Figs. 4 and 5. As shown in Fig. 4, a layer of rubber 31 is applied to the base 32 of the ribs 33, and a layer of fabric 34 is applied over the layer of rubber 32 to form the load carrying band 35. The protective cover 33' for the ribs 33 is made of two plies 33" of nylon fabric impregnated with rubber and bonded together. The layer of fabric 34 may have its yarns arranged as shown in Fig. 6 or 7. Preferably the yarns are arranged at an angle to the axis of the sleeve as shown in Fig. 7 in order to provide greater shear resisting strength along the line between the opposite faces of the torque transmitting hubs 11 and 12.

A further modification of the load carrying band 36 is shown in Fig. 5, in which the band comprises a substantially non-extensible cord 37, which is helically wound over the bases 38 of the ribs 39 in side by side contacting convolutions. A thin layer, for example .020 inch, of rubber 40 is applied over the helically wound cord 37, and a winding of textile fabric 41, preferably of the type illustrated in Fig. 6 is applied over the layer of rubber 40. The protective rib cover 42, rib core 43, and layers 37, 40 and 41 of material are bonded together in a unitary structure by the vulcanization of the coatings of rubber applied to each of the layers.

The rubber layer 31 in Fig. 4 and the rubber layer 40 in Fig. 5 provides better adhesion between the surfaces with which they make contact, and the layer of rubber 31 in Fig. 4 cushions the load transmitted from the ribs 33 to the load carrying band 35. The coupling sleeves in each case may be built up and vulcanized into a unitary structure as described above and in reference to Fig. 3.

While the preferred forms of this invention have been described herein, it will be understood that changes in the details thereof may be made without departing from the spirit of this invention, and it is intended to cover all those changes which come within the scope of the appended claims.

Having thus described by invention, what I claim and desire to protect by Letters Patent is:

1. An improved flexible silent shaft coupling comprising a pair of hubs adapted to be connected to oppositely disposed shafts, each of said hubs having oppositely disposed end faces and axially extending grooves in their peripheries, each said groove on one hub being aligned with a corresponding groove on the opposite hub, a coupling sleeve snugly fitting over said hubs and having axial flexibility in its circumferential area positioned radially opposite said faces of said hubs, said sleeve comprising a plurality of circumferentially spaced axially extending continuous ribs and a load carrying band united to said ribs, one end of each said rib extending into a groove in one hub and the other end extending into the aligned groove in the opposite hub, said ribs comprising a resilient flexible core and a fabric cover bonded thereto and to said band in the spaces between said ribs, and said band being relatively thin and flexible in its circumferential area opposite said faces of said hubs.

2. A shaft coupling comprising a pair of oppositely disposed hubs adapted to be connected to oppositely disposed shafts, said hubs having axially extending grooves in their outer peripheries, an axially flexible coupling sleeve having a plurality of circumferentially spaced axially extending ribs on its inner periphery, said grooves in said hubs being in axial alignment with each other and one part of each of said ribs on said sleeve slidably fitting into said groove in one hub and the other part into the aligned groove of the opposite hub, said sleeve comprising an axially flexible annular load carrying band, said band comprising at least one layer of a woven fabric having the yarns therein disposed at equal angles to the axis of said sleeve, said ribs comprising a core of rubber bonded to said band, and a protective reinforcing fabric cover bonded to the inwardly projecting core of said ribs and to said band in the space between said ribs.

3. A shaft coupling comprising a pair of oppositely disposed hubs adapted to be connected to oppositely disposed shafts, said hubs having axially extending grooves in their outer peripheries, an axially flexible coupling sleeve adapted to snugly fit over said hubs and having a plurality of circumferentially spaced axially extending ribs on its inner periphery, said grooves in said hubs being in axial alignment with each other and one part of each of said ribs on said sleeve extending into said groove in one hub and the other part into the aligned groove of the opposite hub to form a snug fit with said grooves, said sleeve comprising an annular thin axially flexible load carrying band, said band comprising a helically wound cord, said ribs comprising a core of rubber bonded to said band, and a protective reinforcing fabric cover bonded to the inwardly projecting core of said ribs and to said band in the space between said ribs.

4. A shaft coupling comprising a pair of oppositely disposed hubs adapted to be connected to oppositely disposed shafts, said hubs having axially extending grooves in their outer peripheries, an axially flexible coupling sleeve having a plurality of circumferentially spaced axially extending ribs on its inner periphery, said grooves in said hubs being in axial alignment with each other and one part of each of said ribs on said sleeve slidably fitting into said groove in one hub and the other part into the aligned groove of the opposite hub, said sleeve comprising an annular thin axially flexible load carrying fabric band, a layer of rubber bonded to the inner periphery of said load carrying band, said ribs comprising a core of rubber bonded to said layer of rubber, and a fabric cover bonded to the inwardly projecting core of said ribs and to said layer of rubber in the space between said ribs.

References Cited in the file of this patent

UNITED STATES PATENTS

| 1,983,007 | Simons | Dec. 4, 1934 |
| 2,272,900 | Saurer | Feb. 10, 1942 |
| 2,740,271 | Beler | Apr. 3, 1956 |